United States Patent
Kuang et al.

(10) Patent No.: US 9,272,697 B2
(45) Date of Patent: Mar. 1, 2016

(54) LIMITING REGENERATIVE TORQUE FOR A HYBRID ELECTRIC POWERTRAIN

(71) Applicant: FORD GLOBAL TECHNOLOGIES LLC, Dearborn, MI (US)

(72) Inventors: Ming L. Kuang, Canton, MI (US); Yanan Zhao, Ann Arbor, MI (US); Zhengyu Dai, Canton, MI (US); Francis T. Connolly, Ann Arbor, MI (US); Bernard D. Nefcy, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 113 days.

(21) Appl. No.: 14/243,171

(22) Filed: Apr. 2, 2014

(65) Prior Publication Data

US 2015/0283988 A1    Oct. 8, 2015

(51) Int. Cl.
| | |
|---|---|
| B60W 30/18 | (2012.01) |
| B60L 7/10 | (2006.01) |
| B60W 10/02 | (2006.01) |
| B60W 10/08 | (2006.01) |
| B60W 10/18 | (2012.01) |
| B60W 10/196 | (2012.01) |

(52) U.S. Cl.
CPC ............... *B60W 10/02* (2013.01); *B60W 10/08* (2013.01); *B60W 10/18* (2013.01); *B60W 10/196* (2013.01); *B60W 2510/02* (2013.01); *B60W 2510/08* (2013.01); *B60W 2710/18* (2013.01); *Y10T 477/24* (2015.01)

(58) Field of Classification Search
CPC . B60W 30/18127; B60L 7/10; B60Y 2300/89
See application file for complete search history.

(56) References Cited

U.S. PATENT DOCUMENTS

| | | | |
|---|---|---|---|
| 7,055,635 B2 | 6/2006 | Itoh et al. | |
| 2001/0024062 A1* | 9/2001 | Yoshino | B60K 6/48 303/152 |
| 2002/0116101 A1 | 8/2002 | Hashiba et al. | |
| 2003/0080614 A1* | 5/2003 | Soga | B60K 6/44 303/152 |
| 2003/0168266 A1 | 9/2003 | Sasaki et al. | |
| 2003/0186778 A1* | 10/2003 | Yamamoto | B60K 6/485 477/5 |
| 2004/0122579 A1* | 6/2004 | Ashizawa | B60L 7/26 701/70 |
| 2006/0142115 A1* | 6/2006 | Senda | B60W 10/02 477/6 |

* cited by examiner

*Primary Examiner* — Tisha Lewis
(74) *Attorney, Agent, or Firm* — David B. Kelley; MacMillan, Sobanski & Todd, LLC

(57) ABSTRACT

Regenerative torque is limited for a hybrid electric powertrain of a vehicle. A transmission controller determined torque limit is validated by a vehicle controller. The vehicle controller validates the torque limit using, individually or in combination, an actual status of a torque converter clutch, a detected status of the torque converter clutch, or a speed of the vehicle.

17 Claims, 3 Drawing Sheets

LIMITING REGENERATIVE TORQUE FOR A HYBRID ELECTRIC POWERTRAIN

BACKGROUND OF INVENTION

The present invention relates to a method of controlling torque in an automotive powertrain and in particular to a method of limiting torque during a regenerative mode of the automotive powertrain.

A hybrid powertrain of an automotive vehicle includes an electric machine. The machine may be operated in a propulsive mode where the machine rotates to produce a torsion force that propels the vehicle. Alternatively, the machine may be operated in a regenerative mode to brake the vehicle and produce an electrical charge that is stored in a battery. During the regenerative mode, a torque converter clutch may need to be locked to transmit kinetic energy through the powertrain to the machine. To facilitate opening the torque converter clutch when exiting the regenerative mode, a transmission controller may set a regenerative torque limit based on the status of the torque converter clutch.

However, the status of the torque converter clutch used by the transmission controller to set the regenerative torque limit may be less accurate than desired.

SUMMARY OF INVENTION

An embodiment contemplates a method of limiting torque for an automotive powertrain. A current regenerative braking torque limit is received from a transmission controller. A status of a torque converter clutch is determined. A new torque limit is determined as a function of the current torque limit and status. Regenerative braking is limited using the new torque limit.

Another embodiment contemplates a method of limiting torque for an automotive powertrain. A current regenerative braking toque limit is received from a transmission controller. A vehicle speed is detected. A new torque limit is determined as a function of the current limit and vehicle speed. Regenerative braking is limited using the new torque limit.

Another embodiment contemplates a method of limiting torque for an automotive powertrain. A current regenerative braking torque is received from a transmission controller. A status of a torque converter clutch is determined. A first modified torque limit is determined as a function of the current limit and status. A vehicle speed is detected. A second modified torque limit is determined as a function of the first limit and vehicle speed. Regenerative braking torque is limited using the second limit.

An advantage of an embodiment is that the torque converter clutch status used by the transmission controller when setting the regenerative torque limit is validated. This improves efficiency of operating the torque converter clutch.

DETAILED DESCRIPTION

Figure 1:
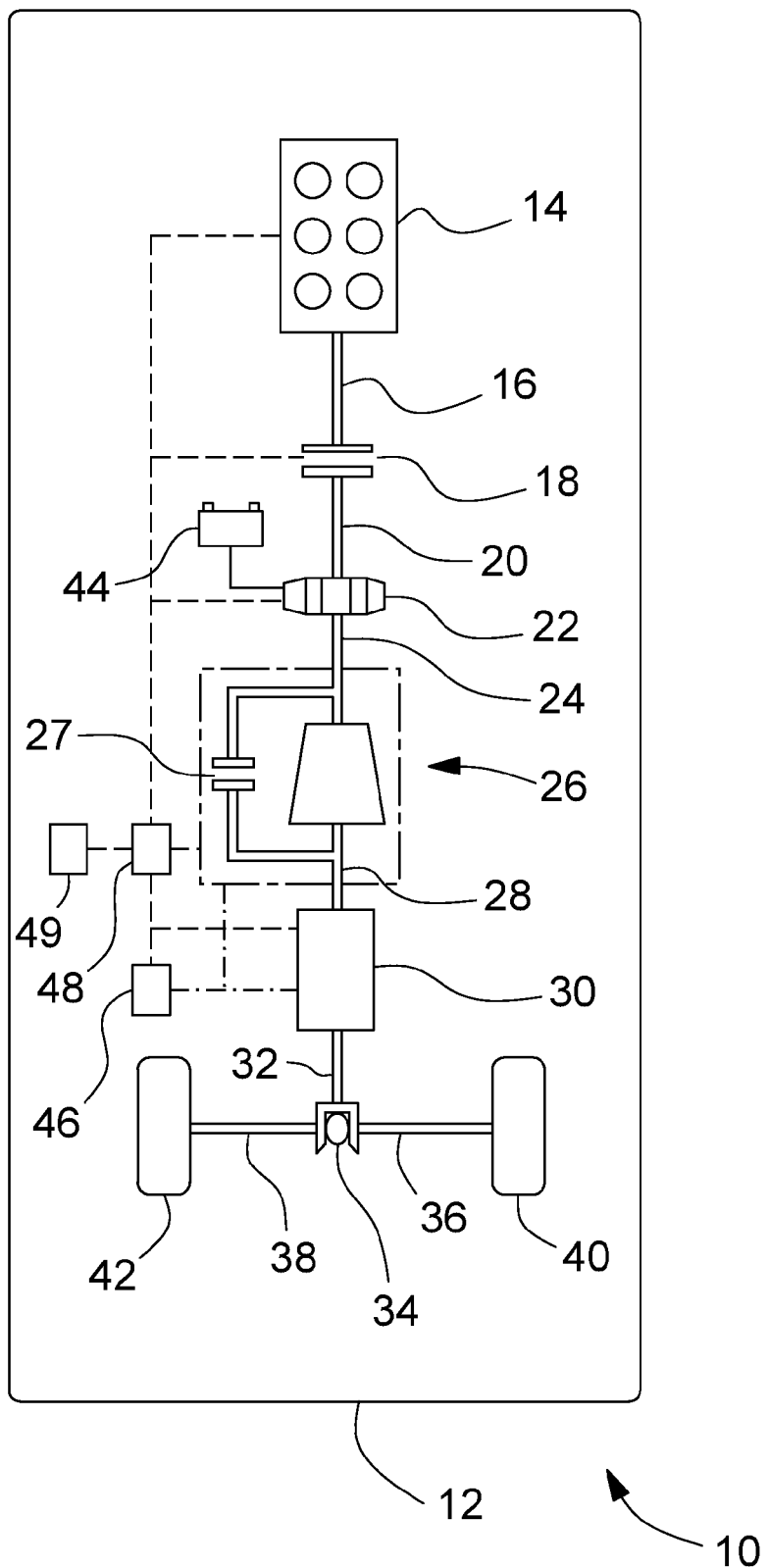
FIG. 1 is a schematic view of a hybrid electric powertrain.

FIG. 1 schematically illustrates a hybrid electric powertrain 10 for an automotive vehicle 12. This powertrain 10 is merely exemplary, and may take other forms, which may be front wheel drive, rear wheel drive, and all wheel drive types of powertrains. As described, the powertrain 10 is a parallel type hybrid electric powertrain but may also be another powertrain known to one skilled in the art such as an electric only powertrain and series and powersplit type hybrid electric powertrains.

The powertrain 10 includes an internal combustion engine 14 powering a crankshaft 16. Interposed between the engine 14 and an electric machine 22, which may be an electric motor or motor/generator, is a clutch 18. When engaged, the clutch 18 connects the crankshaft 16 with an electric machine input 20 and transmits torque between the engine 14 and the machine 22. In turn, the machine 22 transmits torque to a torque converter 26 through a torque converter input 24 and the torque converter 26 transmits torque to a transmission 30 through a transmission input 28. The transmission 30 turns a driveshaft 32 which in turn drives a differential 34. The differential 34 transmits torque to first and second axles 36 and 38, respectively, which drive first and second wheels 40 and 42, respectively. As known to one skilled in the art, the machine 22 may be operated in a regenerative mode to brake the vehicle 12 and charge a battery 44.

The torque converter 26 includes a torque converter clutch (TCC) 27 which allows the torque converter 26 to be locked. The torque converter 26 also includes an impeller connected to the torque converter input 24 and a turbine connected to the transmission input 28. The torque converter clutch 27 mechanically engages the impeller and turbine to selectively lock the torque converter 26. A status of the torque converter clutch 27 may include a locked, slipping, open, or fault state. In the locked state, the impeller and turbine of the torque converter clutch 27 are mechanically engaged and rotating at the same speed without slipping. In the slipping state, the impeller and turbine are hydraulically transmitting torque, with the clutch 27 mechanically transmitting some of the torque as well, but the impeller and turbine rotate at two different speeds. In the open state the torque converter clutch 27 is not transmitting torque so the impeller and turbine transmit the torque hydraulically. In the fault state an error regarding the status of the torque converter 26 has been reported.

Operation of the torque converter 26 and transmission 30 is controlled by a transmission controller (TC) 46. Operation of the powertrain 10, including the engine 14, clutch 18, machine 22, and transmission 30, is controlled by a vehicle controller (VC) 48. Also, the transmission controller 46 coordinates with the vehicle controller 48. A vehicle speed sensor 49 detects the vehicle speed and communicates with the vehicle controller 48. The vehicle speed sensor 49 may be conventional and detect vehicle speed based on techniques known to those skilled in the art.

Figure 2:
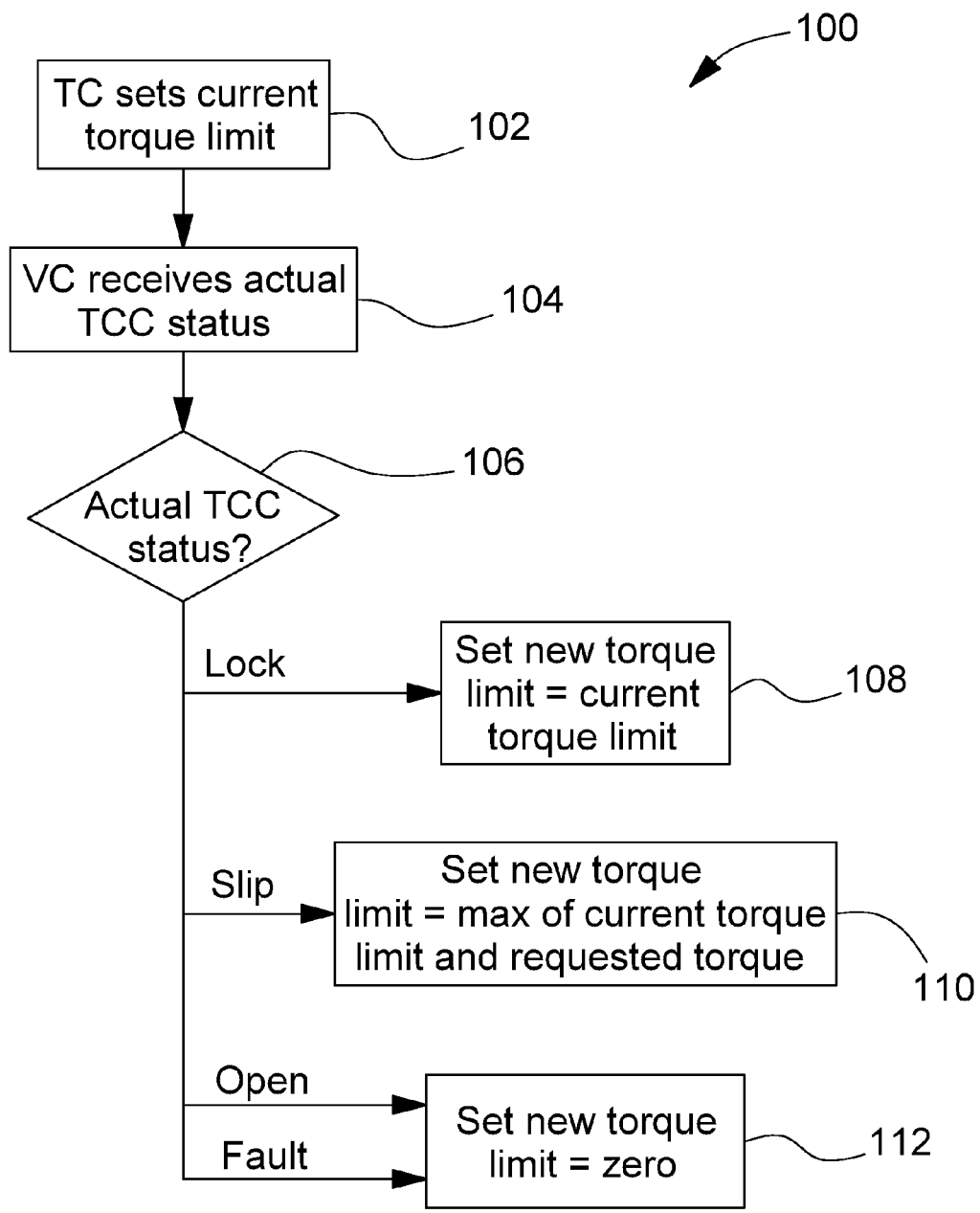
FIG. 2 is a flow chart of a control routine for a hybrid electric powertrain.

FIG. 2 will now be discussed with reference to FIG. 1. FIG. 2 illustrates a control routine 100 for the powertrain 10. The control routine 100 uses an actual status of the torque converter clutch 27.

In a step 102, the transmission controller 46 sets a current torque limit for operation of the powertrain 10 in the regenerative mode. In a step 104, the vehicle controller 48 receives an actual status of the torque converter clutch 27 from the torque converter 26. In a step 106, the vehicle controller 48 sets a new torque limit as a function of the received actual status of the torque converter clutch 27. In a step 108, when the actual state is locked, the new torque limit is set equal to the current torque limit set by the transmission controller 46. When the actual state is slipping, additional regenerative torque is prevented from being transmitted through the torque converter clutch 27. In a step 110, when the actual state is slipping, the new torque limit is set equal to the greater of the current torque limit and a requested torque limit. The requested torque limit may be used as the new torque limit when it exceeds the current torque limit because the actual status of the torque converter clutch is being used. In a step 112, when the actual state is open or fault, the new torque limit is set to zero and the regenerative mode is inhibited. The new torque limit is used to limit torque applied to the torque converter clutch 27 during the regenerative mode.

Figure 3:
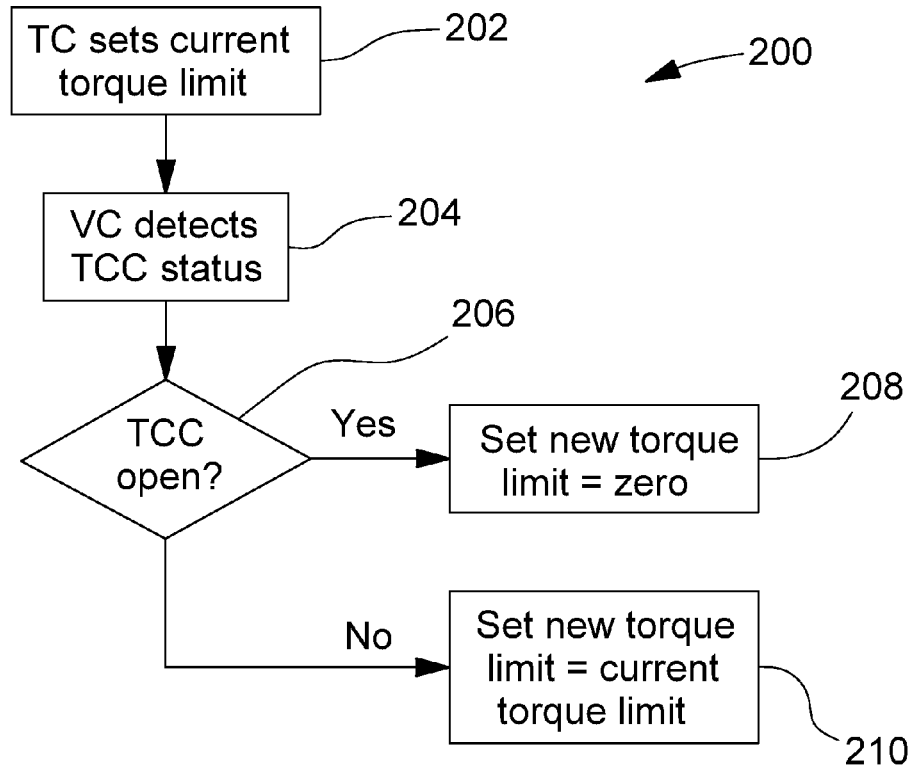
FIG. 3 is a flow chart of a control routine for a hybrid electric powertrain.

FIG. 3 will now be discussed with reference to FIG. 1. FIG. 3 illustrates a control routine 200 for the powertrain 10. The control routine 200 uses a detected status of the torque converter clutch 27.

In a step 202, the transmission controller 46 sets a current torque limit for operation of the powertrain 10 in the regenerative mode. In a step 204, the vehicle controller 48 determines a detected status of the torque converter clutch 27. The detected status is determined using a speed difference between the impeller and turbine. The speed difference is compared to a speed difference threshold to determine whether the torque converter clutch 27 is slipping. The speed difference threshold may be a function of, for example, a speed of the impeller, a speed of the turbine, a torque magnitude for the impeller, a torque magnitude for the turbine, a temperature of transmission oil, and a current gear of the transmission 30. In a step 206, the vehicle controller 48 sets a new torque limit as a function of the detected status of the torque converter clutch 27. In a step 208, when the detected status is open, the new torque limit is set to zero and the regenerative mode is inhibited. In a step 210, when the detected status is other than open, the new torque limit is set equal to the current torque limit set by the transmission controller 46. The new torque limit is used to limit torque applied to the torque converter clutch 27 during the regenerative mode.

Figure 4:
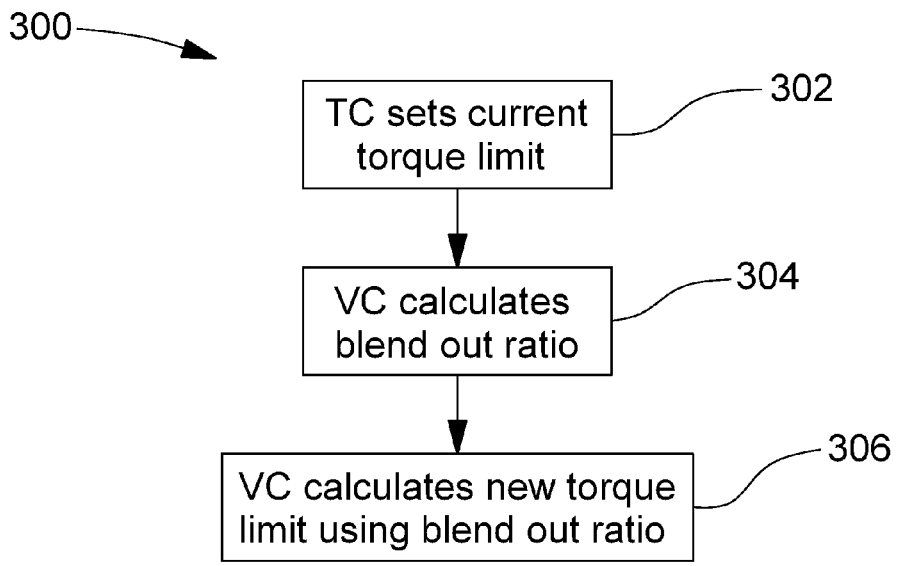
FIG. 4 is a flow chart of a control routine for a hybrid electric powertrain.

FIG. 4 will now be discussed with reference to FIG. 1. FIG. 4 illustrates a control routine 300 for the powertrain 10. The control routine 300 uses a speed of the vehicle 12.

In a step 302, the transmission controller 46 sets a current torque limit for operation of the powertrain 10 in the regenerative mode. In a step 304, the vehicle controller 48 calculates a torque blend out ratio as a function of the speed of the vehicle 12, a maximum vehicle speed threshold for allowing the regenerative mode to operate, and a minimum vehicle speed threshold for inhibiting the regenerative mode. The maximum and minimum vehicle speed thresholds may be calibrated to performance requirements of a given vehicle. The maximum and minimum vehicle thresholds may be calibrated to sufficiently low speeds that the control routine 300 is only used when the current torque limit fails to otherwise ramp out to zero. The torque blend out ratio varies between 0.0 and 1.0 and increases as the vehicle speed increases—i.e., at the maximum vehicle speed threshold the torque blend out ratio is 1.0 and at the minimum vehicle speed threshold the torque blend out ratio is 0.0. In a step 306, the vehicle controller 48 sets a new torque limit by multiplying the current torque limit by the torque blend out ratio. The new torque limit is independent of the status of the torque converter clutch 27 and is used to limit torque applied to the torque converter clutch 27 during the regenerative mode.

The actual status based control routine 100, the detected status based control routine 200, and the vehicle speed based control routine 300 may be used in combination. For example, a current torque limit may be validated by a first control routine to set a first new torque limit, the first new torque limit validated by a second control routine to set a second new torque limit, and the second new torque limit validated by a third control routine to set a final new torque limit.

The first, second, and third control routines may be the actual status based control routine 100, the detected status based control routine 200, and the vehicle speed based control routine 300, respectively. Alternatively, the first, second, and third control routines may be the detected status control based control routine 200, the actual status based control routine 100, and the vehicle speed based control routine 300, respectively. Alternatively, the second control routine may be omitted, in which case the first control routine may be either the actual status based control routine 100 or the detected status based control routine 200 and the third control routine may be the vehicle based control routine 300. Reserving the vehicle based control routine 300 for the third control routine gives the current torque limit set by the transmission controller 46 an opportunity to otherwise ramp out to zero using one or both of the first and second control routines.

While certain embodiments of the present invention have been described in detail, those familiar with the art to which this invention relates will recognize various alternative designs and embodiments for practicing the invention as defined by the following claims.

The invention claimed is:

1. A method of controlling an electrified vehicle powertrain comprising:
limiting regenerative braking using a new torque limit based upon a current regenerative braking torque limit and a status of a torque converter clutch, wherein the clutch status is an actual condition of the clutch, the actual condition of the clutch is a slipping state and the new limit is determined as the greater of the current limit or a current regenerative braking request.

2. The method of claim 1 wherein the actual condition of the clutch is a locked state and the new limit is determined as equal to the current limit.

3. The method of claim 1 wherein the actual condition of the clutch is an open state and the new limit is determined as zero.

4. The method of claim 1 wherein the clutch status is determined by detecting slippage of the clutch.

5. The method of claim 4 wherein the clutch status is a closed state and the new limit is equal to the current limit.

6. The method of claim 4 wherein the clutch status is an open state and the new limit is zero.

7. A method of controlling an electrified vehicle powertrain comprising:
limiting regenerative braking using a new torque limit based upon a current regenerative braking torque limit and a vehicle speed, wherein a torque blendout ratio is calculated as a function of the vehicle speed and the new limit is calculated as a function of the current limit and blendout ratio.

8. A method of controlling an electrified vehicle powertrain comprising:
limiting regenerative braking torque using a second braking torque limit that is a function of a first regenerative braking torque limit and a vehicle speed, where the first limit is a function of a current regenerative braking torque limit and a status of a torque converter clutch.

9. The method of claim 8 wherein the clutch status is an actual condition of the clutch.

10. The method of claim 9 further comprising the steps of:
limiting the first limit to the current limit when the actual condition of the clutch is a lock state;

limiting the first limit as the greater of the current limit or a current regenerative braking request when the actual condition of the clutch is a slipping state;

limiting the first limit to zero when the actual condition of the clutch is an open state; and limiting the first limit to zero when the actual condition of the clutch is a fault state.

11. The method of claim 8 wherein the clutch status is determined by detecting slippage of the clutch.

12. The method of claim 11 further comprising the steps of:
limiting the first limit equal to the current torque limit when the status of the clutch is a closed state;
limiting the first limit to zero when the status of the clutch is an open state.

13. The method of claim 8 comprising the further steps of:
limiting the first torque limit as a function of a preliminary torque limit that is a function of the current limit and the status of the torque converter clutch.

14. The method of claim 13 wherein the preliminary limit is determined using an actual condition of the clutch and the first limit is determined by detecting slippage of the clutch.

15. The method of claim 13 wherein the preliminary limit is determined by detecting slippage of the clutch and the first limit is determined using an actual condition of the clutch.

16. A method of controlling an electrified vehicle powertrain comprising:
limiting regenerative braking using a new torque limit based upon a current regenerative braking torque limit and a status of a torque converter clutch, wherein the clutch status is an actual condition of the clutch, the actual condition of the clutch is a fault state and the new limit is determined as zero.

17. A method of controlling an electrified vehicle powertrain comprising:
limiting regenerative braking using a new torque limit based upon a current regenerative braking torque limit and a vehicle speed, wherein below a vehicle speed range the new limit is determined to be zero, within the speed range the new limit is determined to approach the current limit as the speed increases, and above the speed range the new limit is determined to be equal to the current limit.

* * * * *